United States Patent [19]
Li et al.

[11] Patent Number: 5,504,319
[45] Date of Patent: Apr. 2, 1996

[54] METHOD AND SYSTEM FOR BAR CODE ACQUISITION

[75] Inventors: Chung-Chi J. Li, Stony Brook; Theo Pavlidis, Setauket; Joseph Katz, Stony Brook, all of N.Y.

[73] Assignee: Symbol Technologies, Inc., Bohemia, N.Y.

[21] Appl. No.: 194,592

[22] Filed: Feb. 9, 1994

[51] Int. Cl.⁶ .................................................. G06K 7/10
[52] U.S. Cl. ........................ 235/462; 382/171; 382/318
[58] Field of Search .................................. 382/62, 12, 48, 382/52–53, 18, 51, 171, 282, 283, 183, 271–273, 318; 235/462, 470

[56] References Cited

U.S. PATENT DOCUMENTS

| | | | |
|---|---|---|---|
| 4,897,881 | 1/1990 | Ledinh et al. | 382/28 |
| 4,924,078 | 5/1990 | Sant'Anselmo et al. | 235/494 |
| 4,948,955 | 8/1990 | Lee et al. | 235/462 |
| 4,988,852 | 1/1991 | Krishnan | 235/462 |
| 5,073,953 | 12/1991 | Westdijk | 382/9 |
| 5,086,215 | 2/1992 | Carsner et al. | 235/462 |
| 5,093,872 | 3/1992 | Tutt | 382/56 |
| 5,120,940 | 6/1992 | Willsie | 235/462 |
| 5,134,272 | 7/1992 | Tsuchiya et al. | 235/462 |
| 5,134,669 | 7/1992 | Keogh et al. | 382/61 |
| 5,268,580 | 12/1993 | He | 235/462 |
| 5,296,690 | 3/1994 | Chandler et al. | 235/462 |
| 5,304,787 | 4/1994 | Wang | 235/462 |

Primary Examiner—Joseph Mancuso
Assistant Examiner—Larry J. Prikockis
Attorney, Agent, or Firm—Finnegan, Henderson, Farabow, Garrett & Dunner

[57] ABSTRACT

A scanning system for orienting bar codes use a first stage made up of a low-resolution scanner and a digital signal processor (DSP), and a second stage made up of a high-resolution scanner and a decoder. The first stage scans the surface of an object to obtain an image, which the DSP analyzes to determine the location and orientation of any bar codes. The DSP does this by dividing the image into windows and finding the windows which contain part of a bar code. The second stage receives the results from the DSP and scans the bar code on the object.

14 Claims, 11 Drawing Sheets

METHOD AND SYSTEM FOR BAR CODE ACQUISITION

BACKGROUND OF THE INVENTION

The present invention relates to the locating and reading of bar codes. In particular, the present invention relates to bar code location and acquisition through analysis of an image divided into windows.

Bar codes, such as the UPC or PDF 417, are used in numerous applications such as controlling warehouse inventory and routing overnight packages. Bar codes are generally attached to the surface of an object such as a package, and may contain information identifying the package itself or its contents. To keep track of the location of the package, the bar code is scanned whenever the package is transported or moved.

Most bar codes are rectangular and contain black and white stripes of varying widths. The widths of the stripes encode the information in the bar codes.

To extract that information, a scanner reads the bar code by scanning a light beam across the bar code and detecting the reflected light. That light is then converted into electrical signals which represent the stripes of the bar code, and a decoder extracts the information from the signal.

Scanning a bar code can only occur once the bar code has been located. If a person locates the bar code manually whenever an object is moved, locating the bar code is no problem. However, manual locating is typically more costly and less efficient than automated locating.

One automated locating technique captures a high-resolution image of the surface of an object. The high-resolution image is processed to locate and then decode any bar codes. This technique is expensive, however, due to the costs of a high-resolution scanner capable of capturing a large image plus a processor capable of processing the high-resolution image.

Another automated locating technique requires a unique pattern such as a "bull's eye" to locate the bar code. Under this technique, a high-resolution scanner locates the unique pattern by searching a high-resolution image. When the pattern is located, then the bar code is scanned. Again, this technique requires expensive equipment for scanning and processing a large high-resolution image. Further, the unique pattern takes space away from the bar code, thus reducing the amount of information that can be stored on the bar code.

Accordingly, it is a desire to provide an efficient, inexpensive, and automated method and system for locating and acquiring a bar code.

It is also a desire to acquire a bar code without requiring special printing on the bar code.

SUMMARY OF THE INVENTION

To achieve the foregoing desires, a bar code acquisition method and system use a low-resolution scanner to locate bar codes and a high-resolution scanner to read the bar codes. More particularly and in accordance with the desires of the invention as embodied and broadly described herein, the present invention provides a method of determining a location and orientation of a bar code in an image, the image being represented as a plurality of pixels having associated grey levels, and the pixels being divided into a plurality of windows, the method comprising the steps of analyzing the grey level of the pixels to determine the ones of the plurality of windows which contain part of the bar code, and estimating an orientation of the bar code from the windows determined to contain part of the bar code.

BRIEF DESCRIPTION OF THE DRAWINGS

The accompanying drawings, which are incorporated in and constitute a part of this specification, illustrate a preferred embodiment of the invention and, together with the description, serve to explain the objects, advantages, and principles of the invention.

In the drawings.

DETAILED DESCRIPTION OF THE INVENTION

The present invention is directed to a method and system for determining the location and orientation of a bar code in a field of view. In accordance with the invention, an image is divided into several windows. Each window is tested to see whether it contains part of a bar code by analyzing the grey level of the pixels in that window. If so, an estimate is made of the orientation of the detected bar code.

Reference will now be made in detail to a preferred embodiment of the invention, whose structure and operation are shown in the accompanying drawings.

Figure 1:
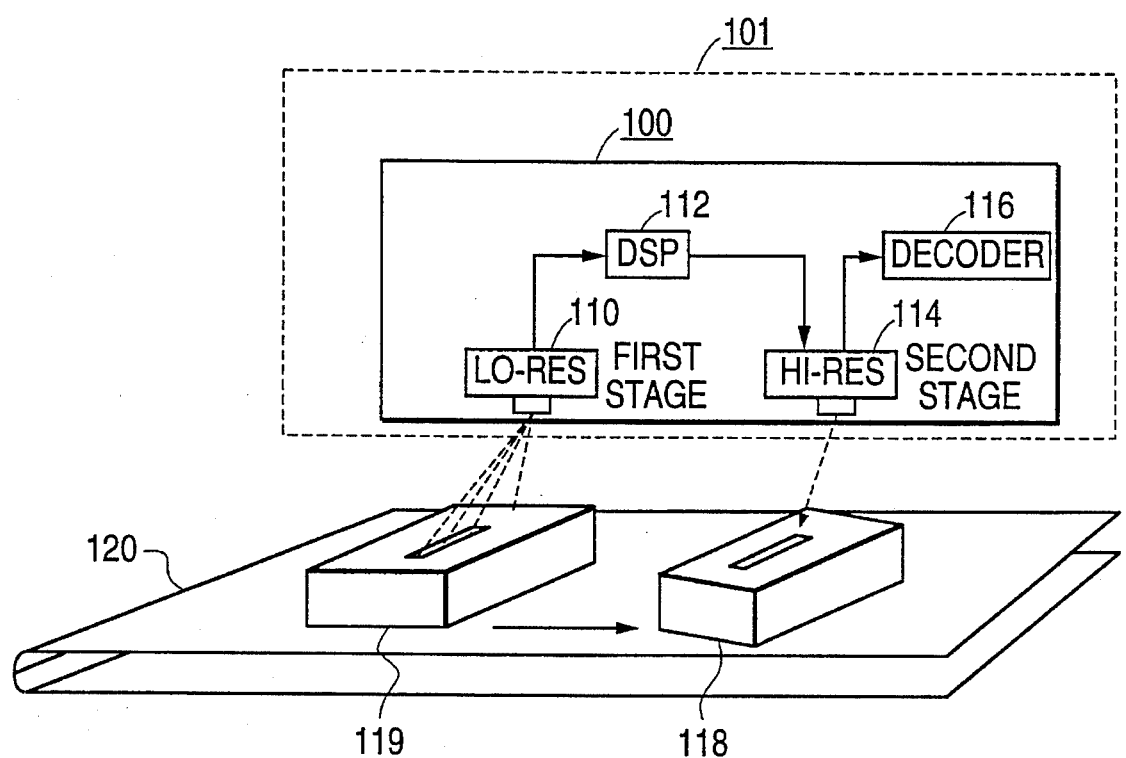
FIG. 1 is a scanning system according to the present invention.

FIG. 1 shows a scanning system 100 in accordance with the present invention. As shown in FIG. 1, scanning system 100 can be part of a larger system 101, which may contain additional components.

In a preferred embodiment, scanning system 100 is divided into two stages, a first stage made up of a low-resolution scanner 110 and a digital signal processor (DSP) 112, and a second stage made up of a high-resolution scanner 114 and a decoder 116. Low-resolution scanner 110 is connected to DSP 112, which in turn is connected to high-resolution scanner 114. High-resolution scanner 114 is connected to decoder 116.

As shown in FIG. 1, packages 118 and 119 each have bar codes on their surface. They are transported past scanning system 100 by a conveyor belt 120. As conveyor belt 120 moves package 119 past the first stage of scanning system 100, low-resolution scanner 110 and DSP 112 determine the location and orientation of any bar codes on the surface of package 119. As conveyor belt 120 moves package 118 past the second stage of scanning system 100, a smaller, high-resolution scanner 114 scans the detected bar codes and decoder 116 decodes them. This two-stage scanning system 100 provides inexpensive and efficient bar code acquisition by using a low-resolution scanner to locate and determine the orientation of bar codes rather than a high-resolution scanner, which only scans bar codes once they have been located.

"Low-resolution" and "high-resolution" are used in this application as relative terms, rather than absolute, to describe the resolution of the scanners of the present invention. The resolution of a scanner, for example, can be measured by the distance from the sensor of the scanner to the scanned object or the size of the scan array. It is understood that one skilled in the art would be able to determine the appropriate resolution of each of the scanners according to applicable engineering design constraints.

Low-resolution scanner 110, which can be a Fairchild 2D CCD camera or a suitable low-resolution scanner, preferably has a wide field of view to allow it to capture an image of the entire surface of package 119. Once scanner 110 captures that image, the image is transmitted to DSP 112. DSP 112 can be an Imaging Technology frame grabber installed on a Sun SPARC station or any other suitable processor capable of performing the described functions.

DSP 112 partitions the captured image into a number of windows for analysis. The number and size of the windows depends on the image being scanned, the speed of DSP 112, and other related factors, such as the size of the bar codes. A person of ordinary skill in the art will be able to determine the size and number of windows for each application as appropriate. Preferably, the size of each window is smaller that the size of any bar code that may be located in the image so that a window located in a bar code area contains only part of the bar code.

Figure 2:
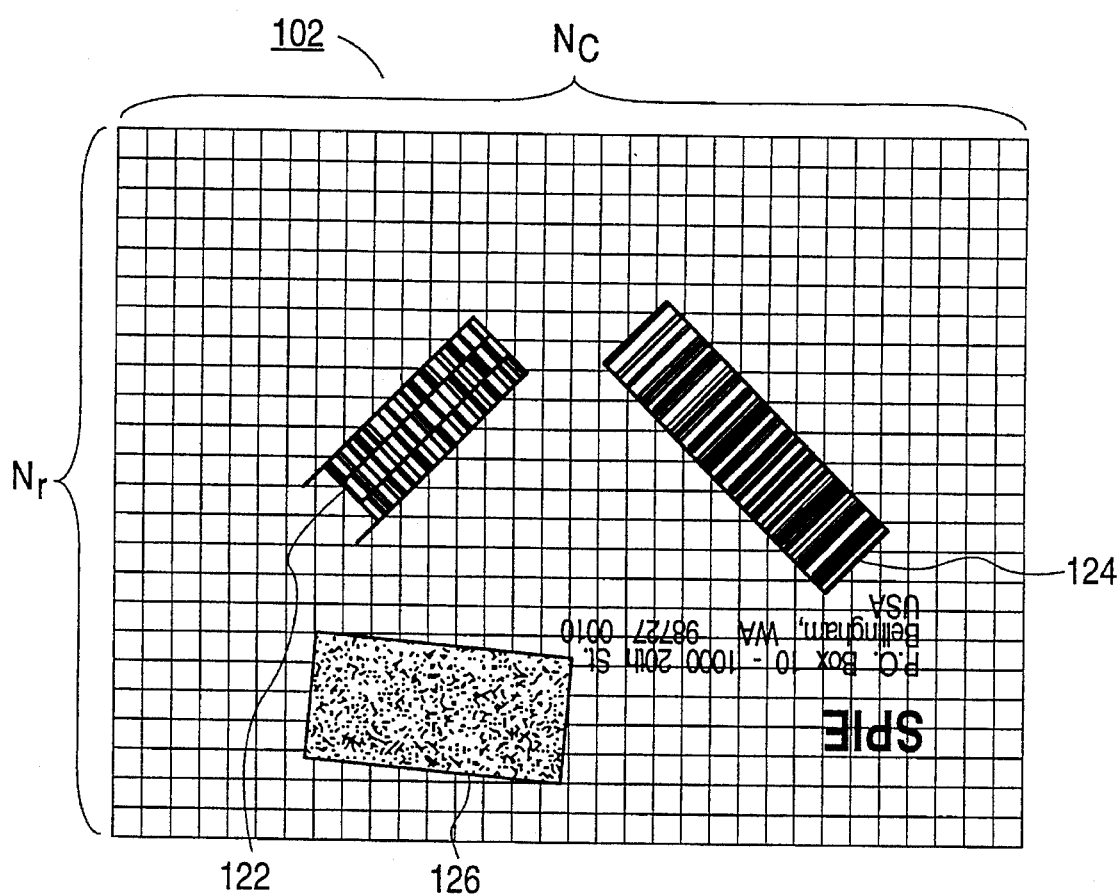
FIG. 2 is an image captured by the scanning system according to the present invention.

As an example, FIG. 2 shows an image 102 received by DSP 112 from low-resolution scanner 110. Image 102 contains bar codes 122, 124, and 126.

As shown in FIG. 2, DSP 112 has divided image 102 into a grid of $N_r \times N_c$ windows. Each window has $M \times M$ pixels, and each pixel has a grey level value indicating its intensity. Of course, the windows need not be square as shown in FIG. 2, but it is preferable that the windows be rectangular to cover image 102 completely without requiring overlap.

Once DSP 112 determines the windows for image 102, DSP 112 examines the statistical properties of each window to determine the location and orientation of bar codes in the image. The preferred techniques for such examination include Candidacy Testing, Window Clustering, and Orientation Estimation, which are described in detail below. When it finishes this task, DSP 112 sends instructions specifying the location and orientation of the bar codes to the second stage.

When high-resolution scanner 114 receives those instructions from DSP 112, scanner 114 scans the bar codes on the appropriate package after the package comes into its field of view. High-resolution scanner 114 then transmits data corresponding to the scanned bar codes to decoder 116, which decodes the bar codes. High-resolution scanner 114 and decoder 116 can be any suitable bar code scanner and decoder that can respond to the instructions of DSP 112.

Figure 3:
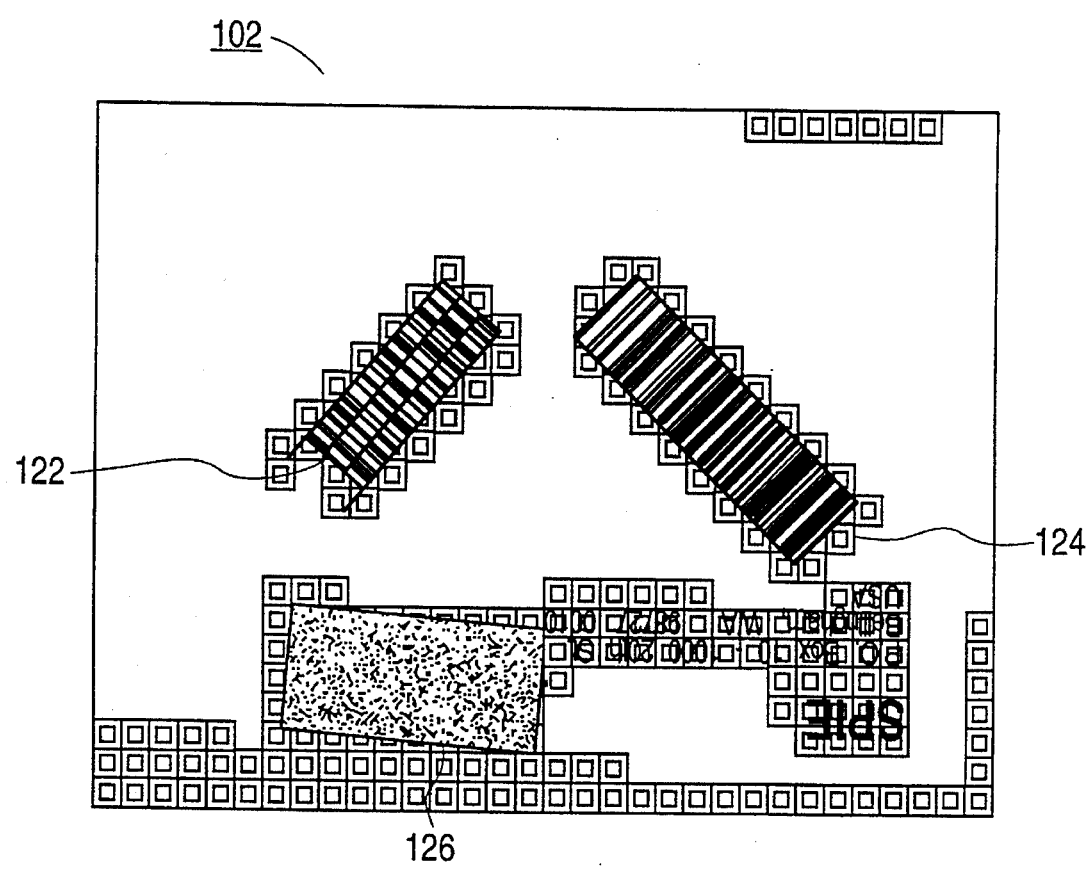
FIG. 3 is the image of FIG. 2 after application of the Contrast Test of the present invention.
Figure 4:
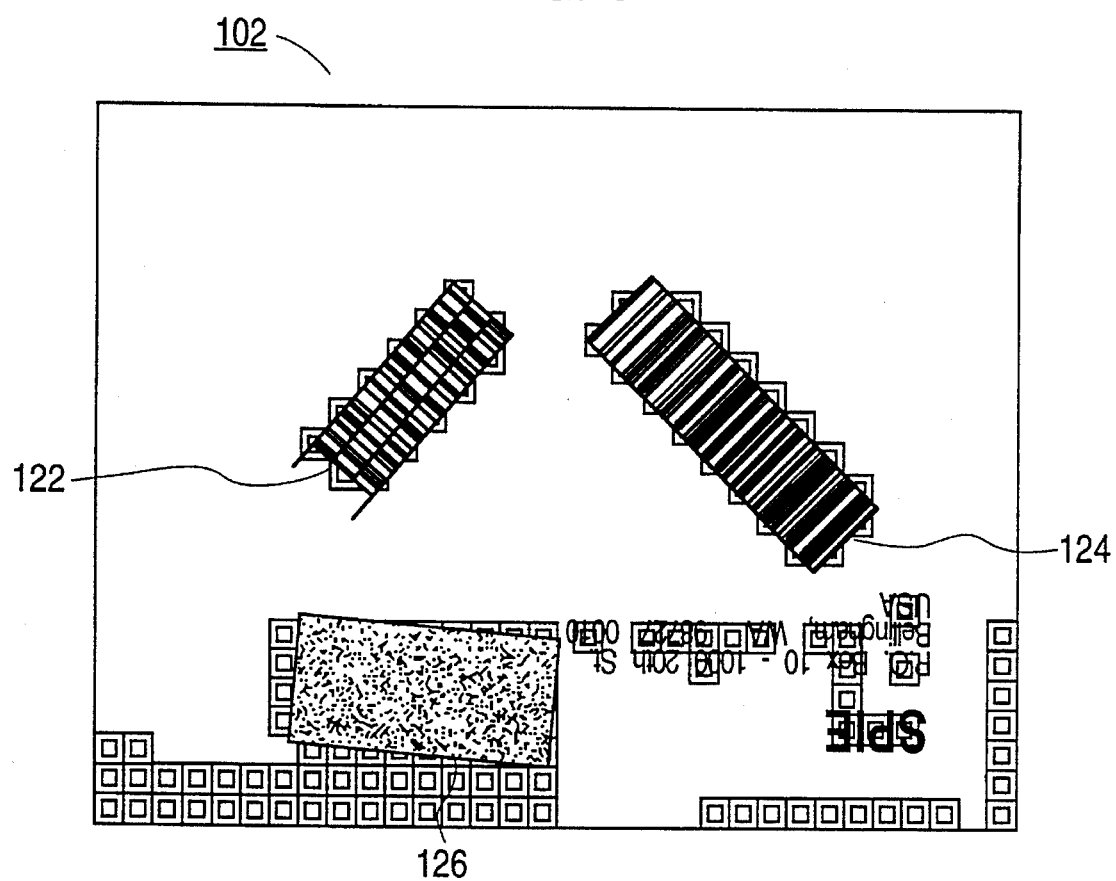
FIG. 4 is the image of FIG. 3 after application of the Balance Test of the present invention.
Figure 5:
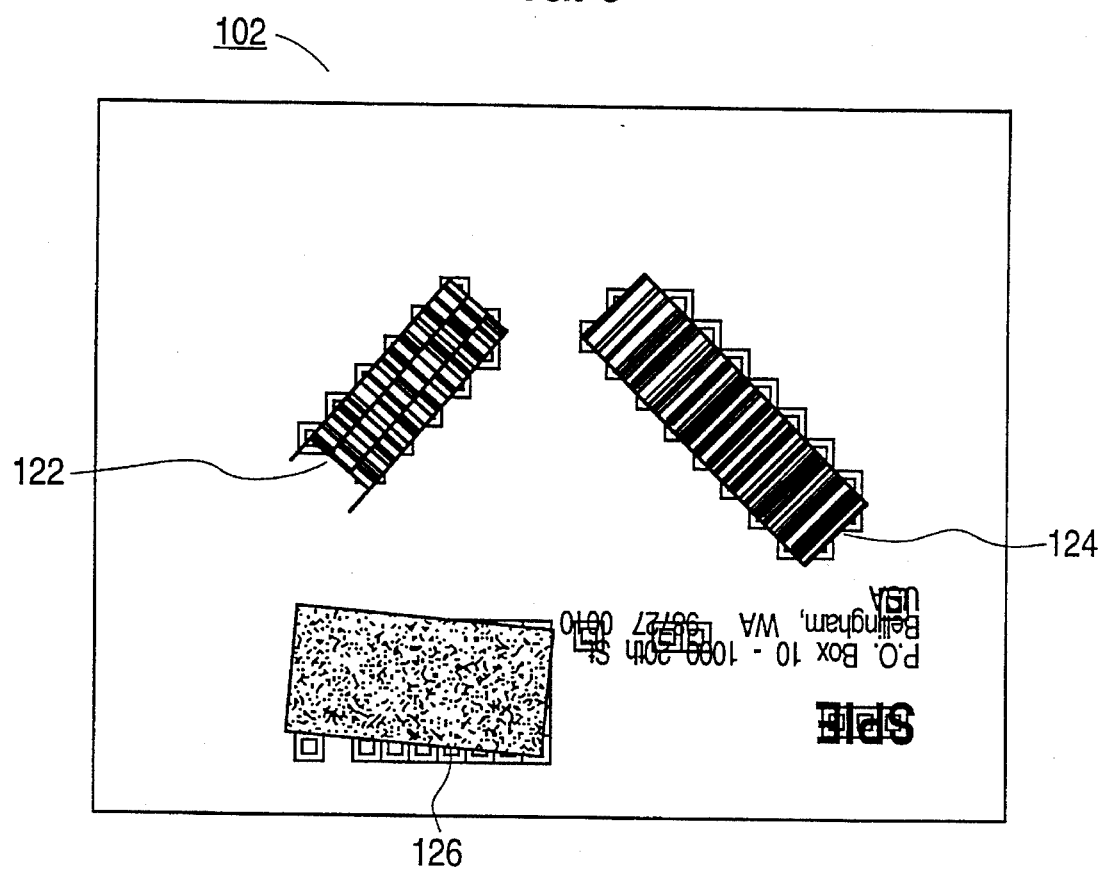
FIG. 5 is the image of FIG. 4 after application of the Transition Count Test of the present invention.
Figure 6:
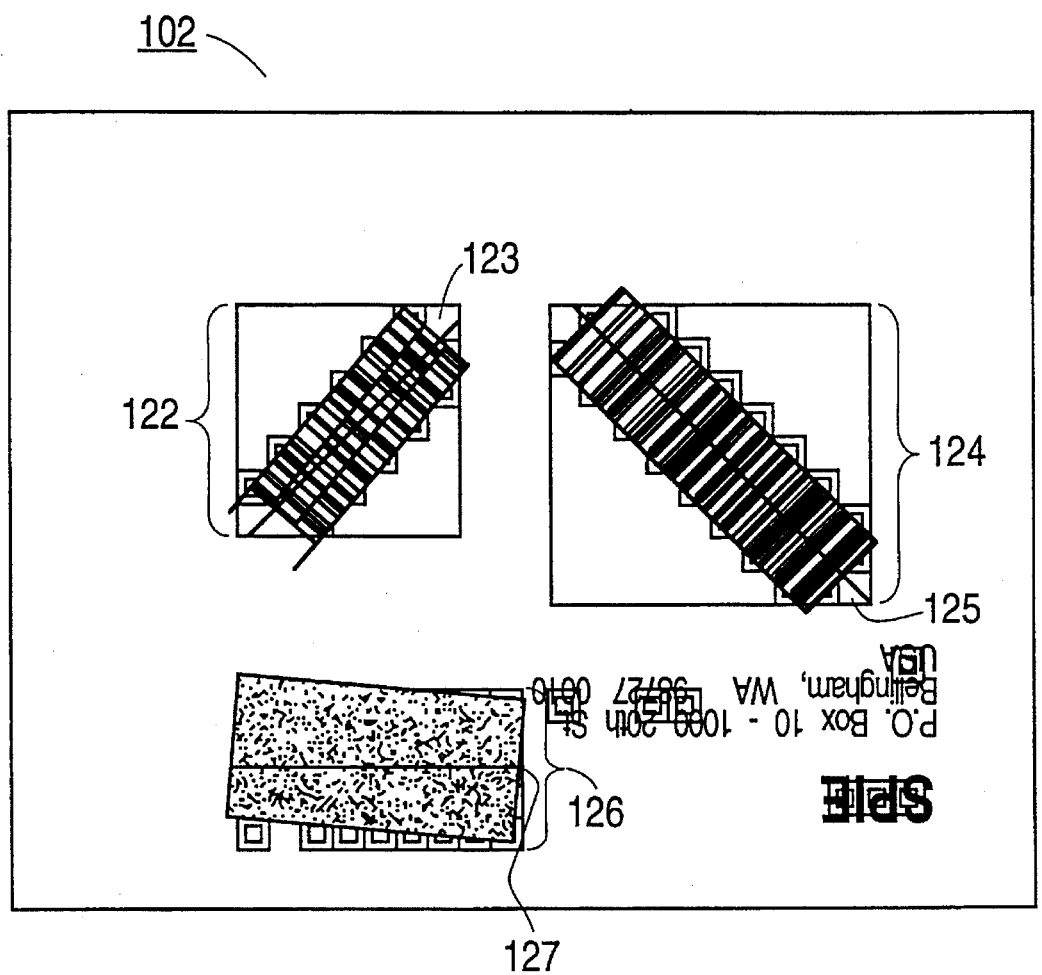
FIG. 6 is the image of FIG. 5 after Window Clustering and Orientation Estimation of the present invention.

As described in greater detail below, FIGS. 3–5 show image 102 after application of each of the three types of Candidacy Testing, and FIG. 6 shows image 102 after application of Window Clustering and Orientation Estimation. FIGS. 7–11 show flow diagrams of each of the three types of Candidacy Testing, Window Clustering, and Orientation Estimation.

In performing Candidacy Testing, DSP 112 examines the statistical properties of each window in image 102 to find which ones contain part of a bar code. There are preferably three Candidacy Tests: Contrast Test, Balance Test, and Transition Count Test. Each test is preferably applied sequentially to image 102 to eliminate windows that do not contain any part of a bar code. After all three tests have been applied, the windows that have not been eliminated, deemed the "remaining candidates," represent the windows most likely containing part of a bar code.

Figure 7:
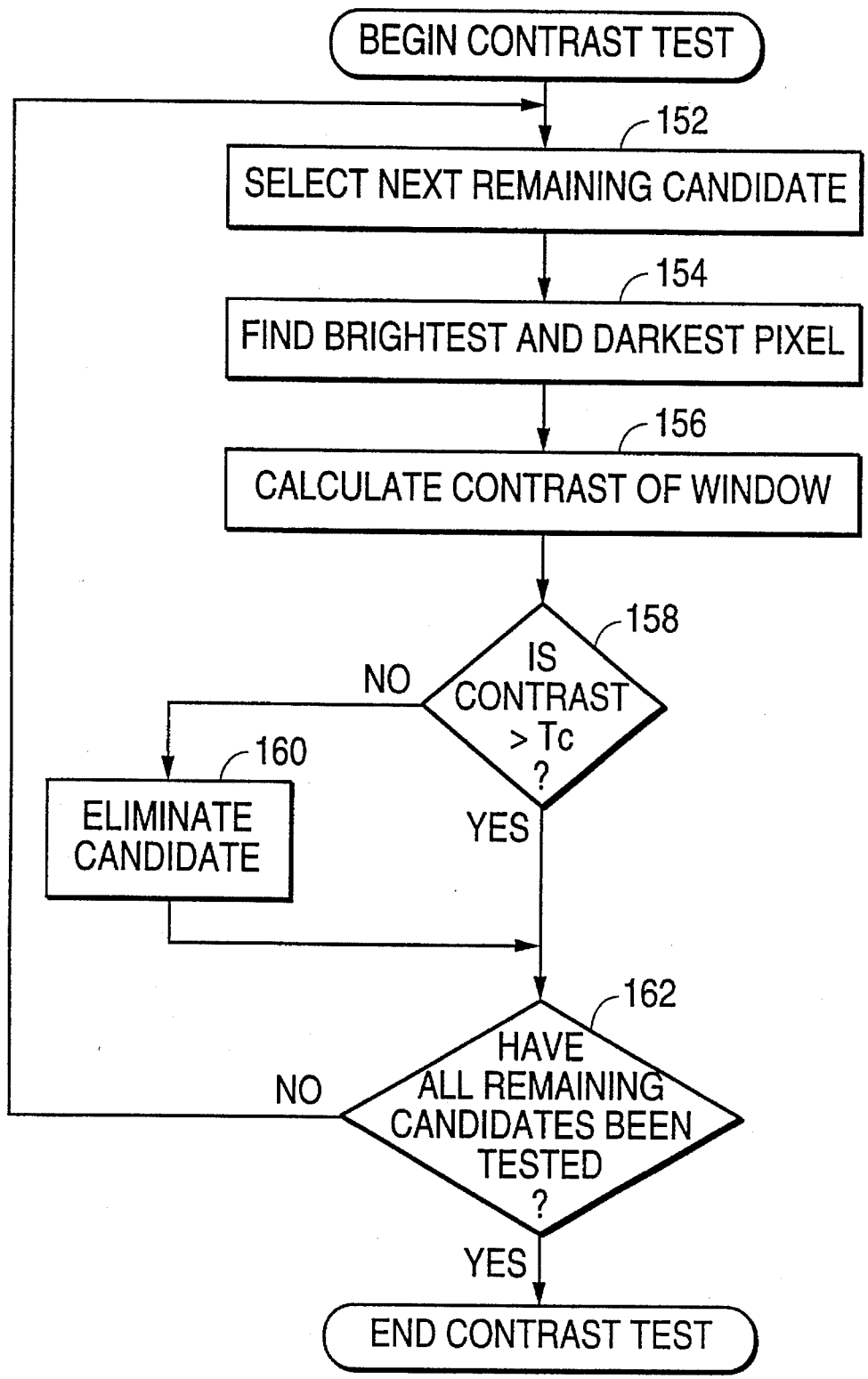
FIG. 7 is a flow diagram of the Contrast Test of the present invention.

FIG. 7 shows a flow diagram of the Contrast Test. The Contrast Test assumes that the bar codes are made up of black and white stripes. A window containing part of a bar code would thus have both black and white pixels. On the other hand, windows that do not contain black and white pixels, but rather even-colored pixels, are determined to contain no bar code portions. In accordance with this premise, as shown in FIG. 7, DSP 112 selects a remaining candidate (step 152), finds the brightest and darkest pixels (step 154), and calculates a contrast of the window as the difference of grey levels between those pixels (step 156). DSP 112 next compares the contrast of the window with a predetermined contrast threshold, $T_c$ (step 158). If the contrast of a window is below $T_c$, then DSP 112 concludes that the window does not contain part of a bar code and eliminates it as a "candidate" (step 160). If a window contains part of a bar code, its contrast would be greater than $T_c$ due to the presence of black and white pixels. The Contrast Test is repeated for each remaining candidate that has not been tested (step 162).

FIG. 3 shows image 102 after application of the Contrast Test. The windows, shown in FIG. 3 as squares, represent the remaining candidates. As shown in FIG. 3, by applying the Contrast Test, a substantial number of windows in the uniform-colored areas have been eliminated and, thus the number of remaining "candidates" has been significantly reduced.

Figure 8:
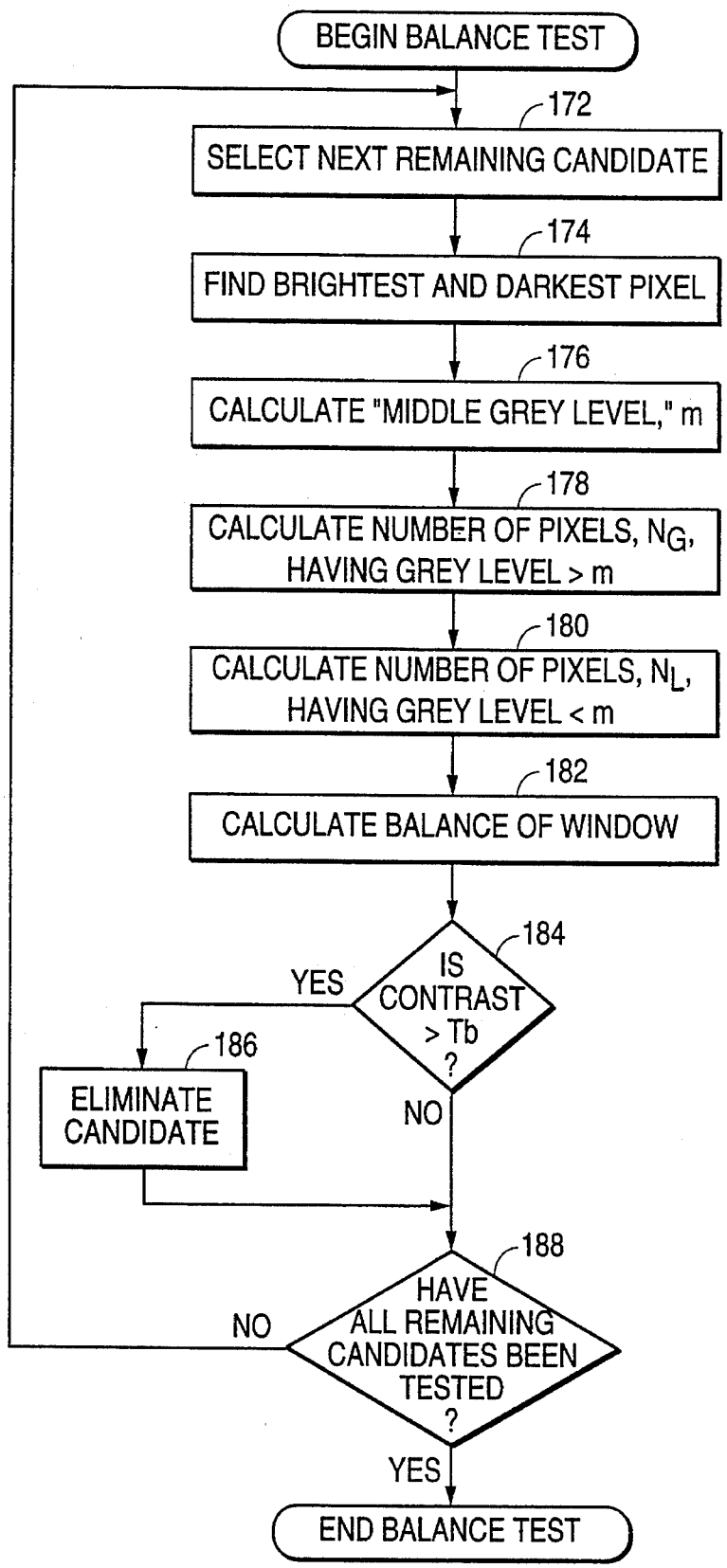
FIG. 8 is a flow diagram of the Balance Test of the present invention.

FIG. 8 shows a flow diagram of the Balance Test. The Balance Test operates on the premise that a bar code area is "well-balanced," meaning it contains approximately the same number of black and white pixels. A text area, on the other hand, is not "well-balanced" because there is no reason to expect that text would have the same number of black and white pixels.

Accordingly, as shown in FIG. 8, DSP 112 selects a remaining candidate (step 172), finds the brightest and darkest pixels in the window (step 174), and calculates a middle grey level, m, as the average between the brightest and darkest pixels in the window (step 176). DSP 112 calculates the number of pixels, $N_G$, having a grey level greater than m (step 178) and the number of pixels, $N_L$, having a grey level less than m (step 180). Then, DSP 112 calculates the "balance" of the window by taking the absolute value of the difference between $N_G$ and $N_L$ (step 182). DSP 112 then determines that a window having a "balance" greater than a predetermined balance threshold, $T_b$, is not "well-balanced" and, thus, eliminates it as a "candidate" (steps 184 and 186). The Balance Test is repeated for each remaining candidate that has not been tested (step 188).

Figure 9:
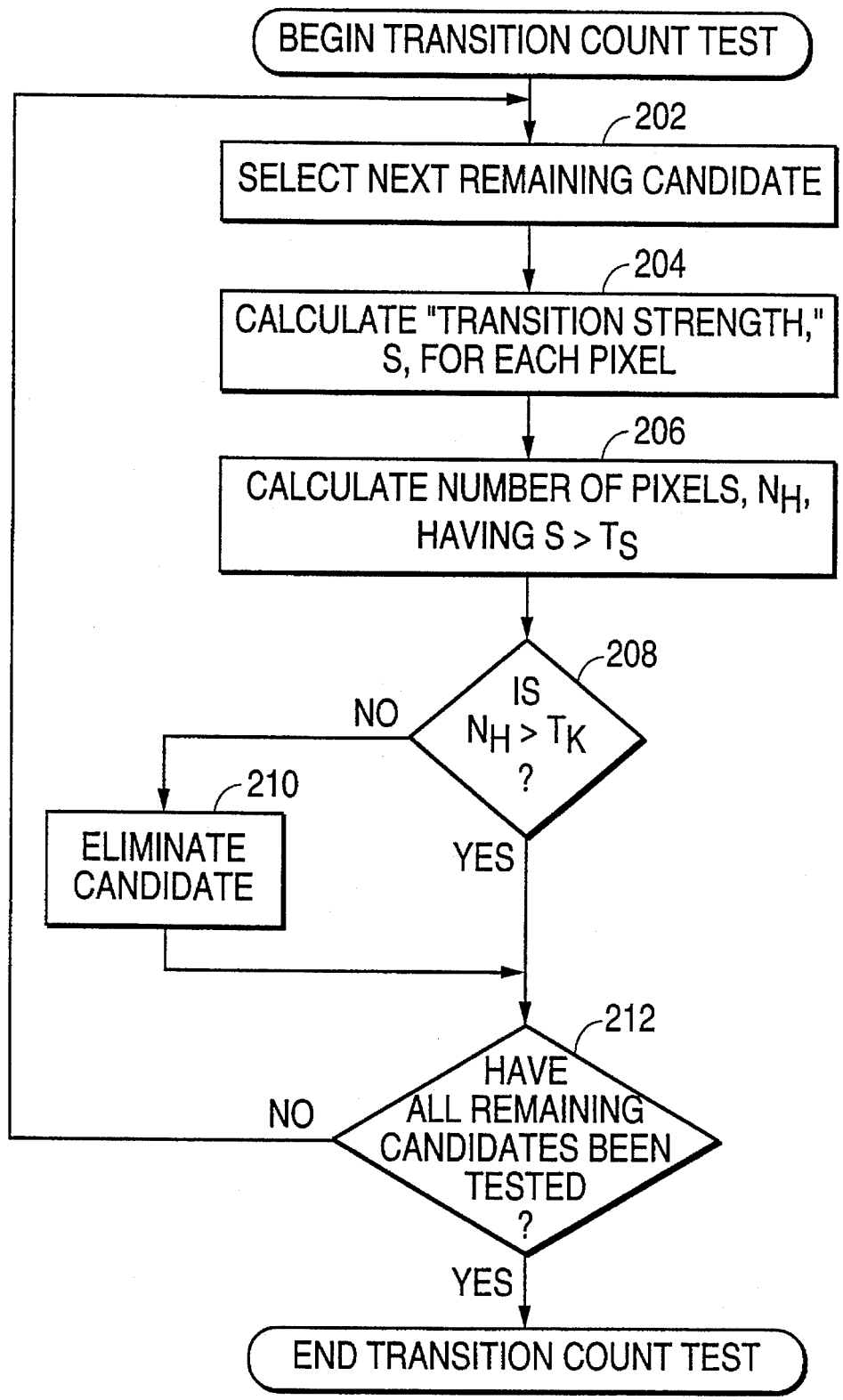
FIG. 9 is a flow diagram of the Transition Count Test of the present invention.

FIG. 4 shows image 102 after application of the Contrast Test and Balance Test. As seen in FIG. 4, a few more of the candidates remaining from the Contrast Test have been eliminated, particularly those in the text areas FIG. 9 shows a flow diagram of the Transition Count Test. The Transition Count Test is intended to eliminate windows that are in picture areas rather than in bar code areas by assuming that the pixels in windows containing part of a bar code have a high transition strength. A high transition strength indicates substantial changes in color between neighboring pixels, which may be due to the interleaving of black and white stripes of a bar code. As shown in FIG. 9, DSP 112 selects a remaining candidate (step 202) and determines the transition strength, S, for each pixel by calculating the difference between the pixel's grey level and the grey level of any one of its neighboring pixels, preferably, right, lower-right, lower, and lower-left pixels (step 204). DSP 112 then calculates the number of pixels, $N_H$, having S greater than a predetermined threshold, $T_s$ (step 206). If DSP 112 finds $N_H$ less than a predetermined number, $T_k$, DSP 112 eliminates as a "candidate" (steps 208 and 210). The Transition Test is repeated for each remaining candidates that has not been tested (step 212).

FIG. 5 shows image 102 after application of the Contrast Test, Balance Test, and Transition Count test. Here, it is seen that additional candidates were eliminated from image 102 of FIG. 4.

Figure 10:
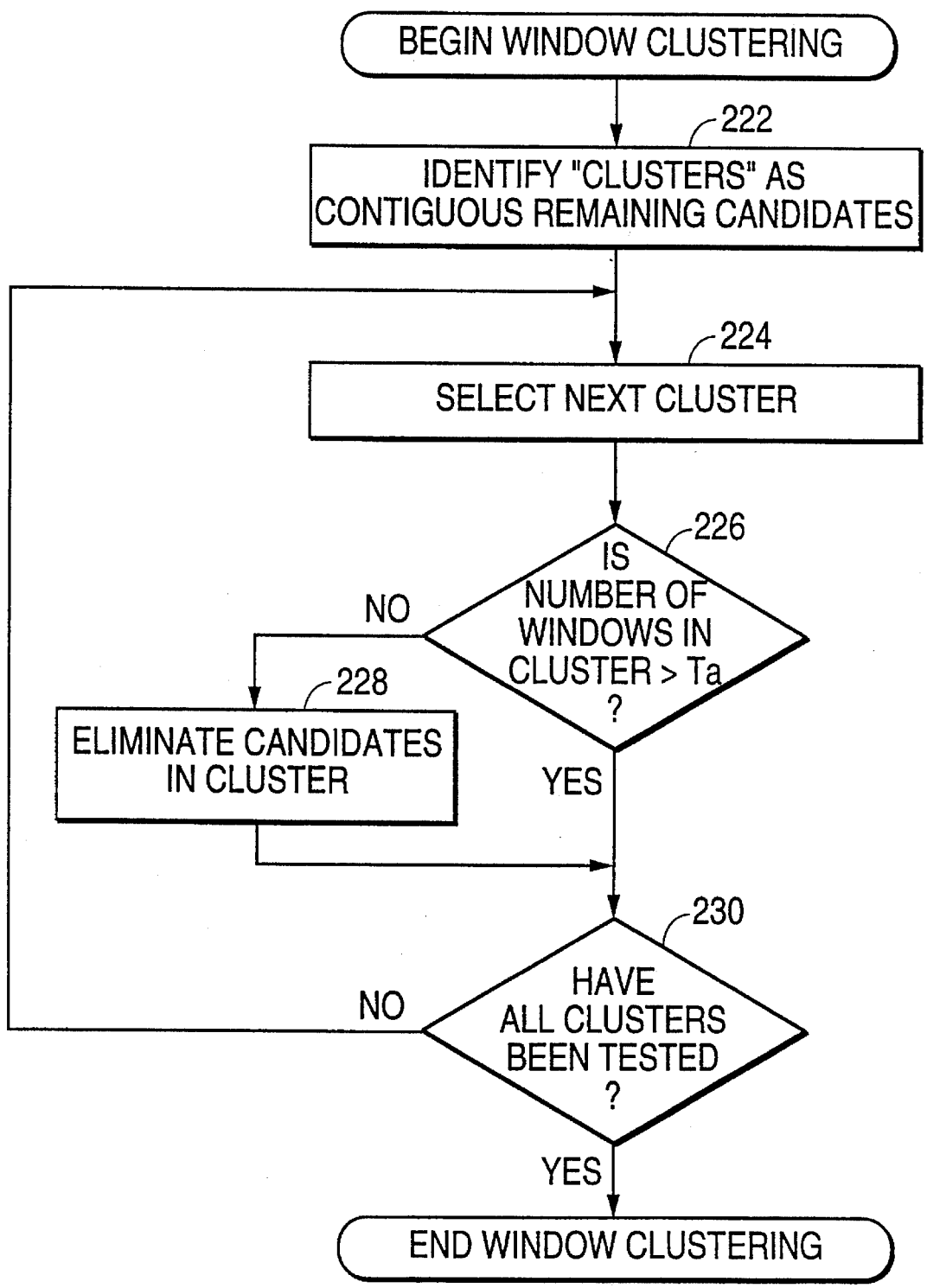
FIG. 10 is a flow diagram of Window Clustering of the present invention.

After completing these three Candidacy Tests, DSP 112 subjects the remaining candidates to Window Clustering analysis. FIG. 10 shows a flow diagrams of Window Clustering analysis. In this analysis, DSP 112 identifies "clusters" as groups of contiguous candidates (step 222). One way that DSP 112 identifies clusters is to define a plurality of "segments" as consecutive candidates in a same row. Then, DSP 112 determines that segments in adjacent rows belong to a cluster if each of the segments has at least one window in a same column.

Since the windows are smaller than the bar codes, one can determine a threshold number of candidates, $T_a$, as the minimum number of windows needed to cover a bar code. DSP 112 selects a cluster (step 224) and determines whether it has more than $T_a$ windows (step 226). If DSP 112 determines that the cluster has fewer than $T_a$ windows, then DSP 112 eliminates the candidates in that cluster (step 228). This analysis is repeated for each cluster that has not been tested (step 230). DSP 112 then treats the remaining clusters as containing bar code areas.

FIG. 6 shows image 102, after it has been subjected to Window Clustering. The candidates over bar codes 122, 124, and 126, respectively, have been clustered and are determined to represent detected bar code areas since each of those clusters has at least $T_a$ windows. FIG. 6 shows these clusters enclosed in boxes.

Once DSP 112 identifies and locates the bar codes using Candidacy Testing and Window Clustering, DSP 112 then determines the orientations of those bar codes to define an aim line that high-resolution scanner 114 can scan. Since bar codes are assumed to be rectangular, the aim line should ideally pass the center of the bar code, parallel to the longer sides. Due to background noise and limited resolution of the windows, however, DSP 112 cannot always precisely determine the aim line.

Figure 11:
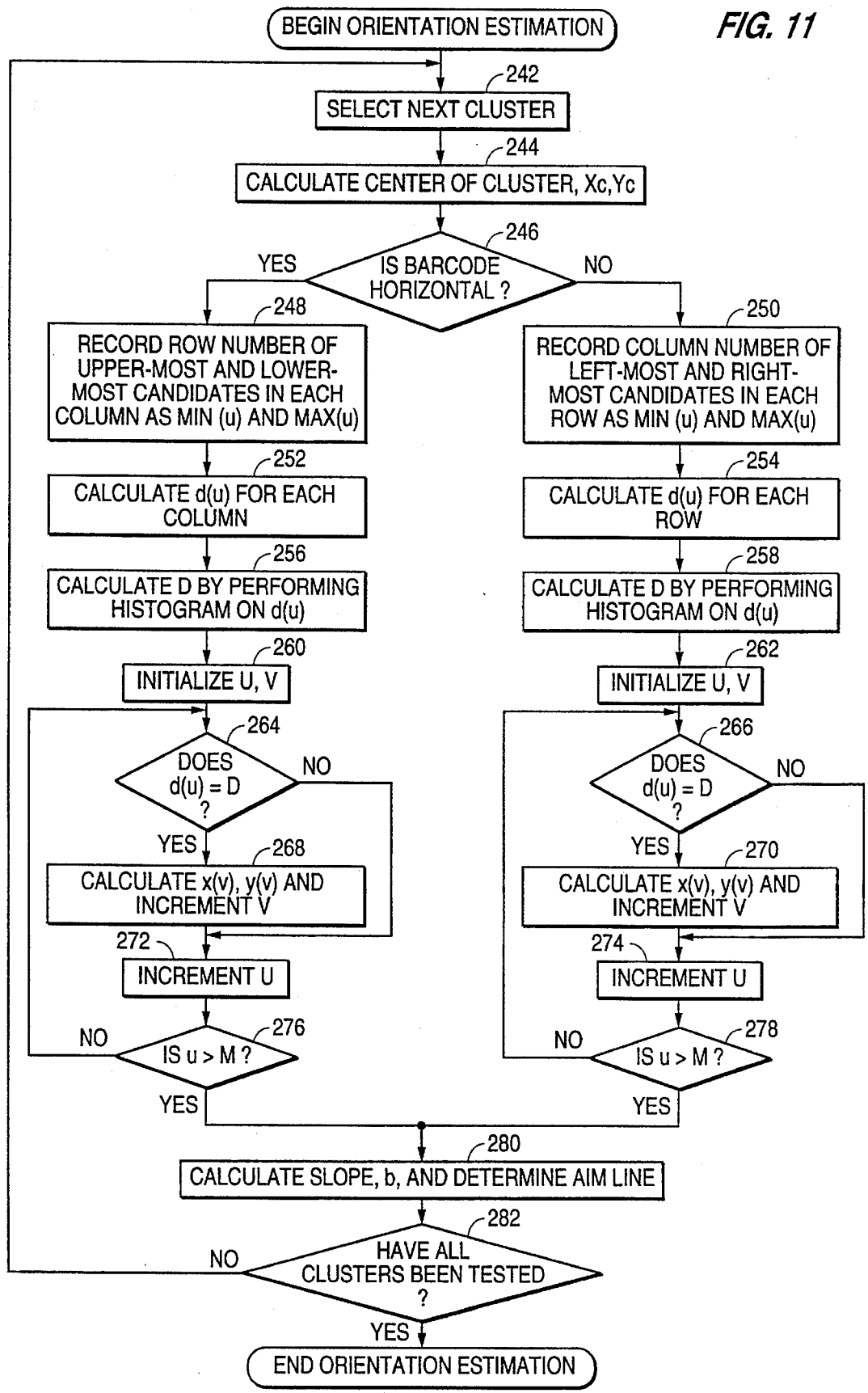
FIG. 11 is a flow diagram of Orientation Estimation of the present invention.

To estimate the aim line, according to the present invention, DSP 112 uses Orientation Estimation for each detected bar code. FIG. 11 shows a flow diagram of Orientation Estimation. Using the Orientation Estimation technique, DSP 112 selects a cluster (step 242) and determines the coordinates of the center of the cluster, $x_c$, $y_c$, by averaging the centers of each window in the cluster (step 244).

Next, DSP 112 determines whether the longer two sides of the enclosing box of the cluster are horizontal, thereby defining a horizontal bar code (step 246). If so, DSP 112 records the row number of the upper-most and lower-most candidate in each column of the cluster as min(u) and max(u), $1 \leq u \leq M$, respectively, where u is a column in the cluster and M is the total number of columns in the cluster (step 248). Then, DSP calculates d(u) for each column as d(u)=max(u)−min(u), $1 \leq u \leq M$ (step 252).

If DSP 112 instead determines that the longer two sides of the enclosing box are not horizontal, thereby defining a vertical bar code, then DSP 112 records the column number of the left-most and right-most candidate in each row of the cluster as min(u) and max(u), $1 \leq u \leq M$, respectively, where u is a row in the cluster and M is the total number of rows in the cluster (step 250). DSP 112 calculates d(u), for each row, as d(u)=max(u)−min(u), $1 \leq u \leq M$ (step 254).

After DSP calculates d(u) for each column or row as described above, it performs a histogram analysis to obtain the most frequently occurring number, D (steps 256 and 258), Finally, DSP 112 performs a straight line regression using a number of different steps. First, for each column u in a horizontal bar code (steps 260, 272, and 276), when DSP 112 determines that d(u)=D (step 264), it sets a variable y(v)= M×((min(u)+max(u))/2+0.5) and a variable x(v)=M×(u+ 0.5) (step 268). The index v is a counter that starts at 1 and is incremented by 1 after each determination of x and y (steps 260 and 268). Alternately, for each row u in a vertical bar code (steps 262, 274, and 278), when DSP 112 determines d(u)=D (step 266), it sets x(v)=M×((min(u)+max(u))/ 2+0.5) and y(v)=M×(u+0.5) and increments v by 1 (step 270).

Finally, DSP 112 fits x(v) and y(v) into a straight regression line using the least square estimator to determine slope b (step 280). DSP 112 determines the aim line as y=b $(x-x_c)+y_c$ and sends this information to high resolution scanner 114 (step 280).

FIG. 6 shows aim lines 123, 125, and 127 passing through bar codes 122, 124, and 126. High-resolution scanner 114 scans a beam along these aim lines to read bar codes 122, 124, and 126.

It will be apparent to those skilled in the art that various modifications and variations can be made in the scanning method and system of the present invention without departing from the spirit or scope of the invention. Thus, it is intended that the present invention cover the modifications and variations of this invention provided they come within the scope of the appended claims and their equivalents.

What is claimed:

1. A method of determining a location and orientation of a linear bar code symbol encoded in one direction and located in an image field, said image field being represented as a plurality of pixels having associated grey levels, and the pixels being organized into a plurality of windows, the method comprising the steps of:

analyzing the grey levels of the pixels to determine a subset of said plurality of windows which contain part of the bar code symbol; and determining the direction in which the bar code symbol is encoded based on the subset of windows determined to contain part of the bar code symbol, wherein the step of analyzing the grey levels of the pixels includes the steps of:

selecting from the plurality of windows a set of windows comprising candidates for containing the bar code symbol; and examining the candidates to eliminate ones of the candidates which do not contain a part of the bar code symbol, and wherein the step of selecting from the plurality of windows includes the steps of:

determining a middle grey level for each of the windows as an average of the grey levels of a brightest pixel and a darkest pixel for each window;

determining a balance figure for each of the windows from a magnitude of a difference between a number of pixels having a grey level higher than the middle grey level and a number of pixels having a grey level lower than the middle grey level; and determining that the windows with balance figures greater than a predetermined threshold are not candidates for containing the bar code symbol.

2. A method according to claim 1, further comprising the steps of:

scanning a viewing area believed to contain the bar code symbol using a low resolution scanner; and storing in a memory of a processor the image field of the scanned viewing area as the plurality of pixels having grey level values.

3. A method according to claim 1, wherein the step of selecting from the plurality of the windows further includes the steps of:

assigning a contrast value for each of the windows corresponding to a grey level of a brightest pixel and a grey level of a darkest pixel within each of the windows; and determining that windows having a contrast value less than a predetermined threshold are not candidates for containing the bar code symbol.

4. A method according to claim 3, wherein the step of selecting from the plurality of the windows further includes the steps of:

determining pixels in each window whose grey level differs from the grey level of a neighboring pixel by more than a predetermined threshold as having high transition strength;

counting the pixels in each window having high transition strength; and determining that windows with fewer pixels having high transition strength than a predetermined threshold are not candidates for containing the bar code symbol.

5. A method according to claim 1, wherein the step of selecting from the plurality of the windows further includes the steps of:

determining the pixels in each window whose grey level differs from the grey level of a neighboring pixel by more than a predetermined threshold as having high transition strength;

counting the pixels in each window having high transition strength; and determining that windows with fewer pixels having high transition strength than a predetermined threshold are not candidates for containing the bar code symbol.

6. The method according to claim 1, wherein the step of examining the candidates includes the steps of:

forming the candidates into clusters of contiguous candidates; and eliminating candidates formed in any cluster having fewer candidates than a predetermined number.

7. A method according to claim 6, wherein the step of forming clusters comprises the steps of:

defining a plurality of segments as consecutive candidates in a same row; and determining that segments in adjacent rows belong to a cluster if each of the segments has at least one window in a same column.

8. A method according to claim 6, wherein the step of determining the direction of the orientation includes the steps of:

determining a cluster center for a remaining cluster from the average location of the centers of the windows in the remaining cluster;

determining a slope of the remaining cluster based on the position of the windows in the remaining cluster; and determining the orientation of the bar code symbol from the cluster center and slope of the remaining cluster.

9. A method according to claim 8, wherein the step of determining the slope further includes the step of using a least square estimator.

10. A method according to claim 1, further comprising the step of scanning the bar code symbol using a high resolution scanner based on the determined direction of the encoding of the bar code symbol.

11. An apparatus for determining a location and orientation of a linear bar code symbol encoded in one direction and located in an image field, said image field being represented as a plurality of pixels having associated grey levels, and the pixels being divided into a plurality of windows, the apparatus comprising:

means for selecting from the plurality of windows a set of windows comprising candidates for containing the bar code symbol;

means for forming the candidates into clusters of contiguous candidates;

means for eliminating candidates formed in any cluster having fewer candidates than a predetermined number; and means for determining the direction in which the bar code symbol is encoded based on the remaining candidates, wherein the means for selecting includes:

means for determining a middle grey level for each of the windows as an average of the grey levels of a brightest pixel and a darkest pixel for each window;

means for determining a balance figure for each of the windows from a magnitude of a difference between a number of pixels having a grey level higher than the middle grey level and a number of pixels having a grey level lower than the middle grey level; and means for determining that the windows with balance figures greater than a predetermined threshold are not candidates for containing the bar code symbol.

12. A system for scanning a bar code symbol on a surface of an object, comprising:

means for obtaining a low-resolution image representing a surface of an object, the image represented as a plurality of pixels having associated grey levels;

means for processing said low-resolution image to determine a location and orientation of a bar code symbol, based upon grey levels of the pixels;

means for scanning said bar code symbol on said surface of said object to read information from said bar code symbol; and means for decoding said information read from said bar code symbol, wherein the processing means includes:

means for dividing the low-resolution image into a plurality of windows;

means for determining a subset of windows containing the bar code based upon grey levels of the pixels as being candidates for containing the bar code, means for forming the candidates into clusters of contiguous candidates;

means for eliminating candidates formed in any cluster having fewer candidates than a predetermined number; and means for determining the location and the orientation of the bar code symbol based upon the remaining candidates, wherein the means for determining a subset of windows includes:

means for determining a middle grey level for each of the windows as an average of the grey levels of a brightest pixel and a darkest pixel for each window;

means for determining a balance figure for each of the windows from a magnitude of a difference between a number of pixels having a grey level higher than the middle grey level and a number of pixels having a grey level lower than the middle grey level; and means for determining that the windows with balance figures greater than a predetermined threshold are not candidates for containing the bar code symbol.

13. A method of determining a location and orientation of a linear bar code symbol encoded in one direction and located in an image field, said image field being represented as a plurality of pixels having associated grey levels, and the pixels being organized into a plurality of windows, the method comprising the steps of:

analyzing the grey levels of the pixels to determine a subset of said plurality of windows which contain part of the bar code symbol; and determining the direction in which the bar code symbol is encoded based on the subset of windows determined to contain part of the bar code symbol, wherein the step of analyzing the grey levels of the pixels includes the steps of:

selecting from the plurality of windows a set of windows which are candidates for containing the bar code symbol; and examining the candidates to eliminate ones of the candidates which do not contain a part of the bar code symbol, and wherein the step of examining the candidates includes the steps of:

forming the remaining candidates into clusters of contiguous candidates; and eliminating candidates formed in any cluster which is smaller than a predetermined size, wherein the step of selecting from the plurality of windows includes the steps of:

determining a middle grey level for each of the windows as an average of the grey levels of a brightest pixel and a darkest pixel for each window;

determining a balance figure for each of the windows from a magnitude of a difference between a number of pixels having a grey level higher than the middle grey level and a number of pixels having a grey level lower than the middle grey level; and determining that the windows with balance figures greater than a predetermined threshold are not candidates for containing the bar code symbol.

14. An apparatus for determining a location and orientation of a linear bar code symbol encoded in one direction and located in an image field, said image field being represented as a plurality of pixels having associated grey levels, and the pixels being organized into a plurality of windows, the apparatus comprising:

means for analyzing the grey levels of the pixels to determine a subset of said plurality of windows which contain part of the bar code symbol; and means for determining the direction in which the bar code symbol is encoded based on the subset of windows determined to contain part of the bar code symbol, wherein the analyzing means comprises:

means for selecting from the plurality of windows a set of windows comprising candidates for containing the bar code symbol; and means for examining the candidates to eliminate ones of the candidates which do not contain a part of the bar code symbol, and wherein the selecting means comprises:

means for determining a middle grey level for each of the windows as an average of the grey levels of a brightest pixel and a darkest pixel for each window;

means for determining a balance figure for each of the windows from a magnitude of a difference between a number of pixels having a grey level higher than the middle grey level and a number of pixels having a grey level lower than the middle grey level; and means for determining that the windows with balance figures greater than a predetermined threshold are not candidates for containing the bar code symbol.

\* \* \* \* \*